US005298851A

United States Patent [19]

DeNardis

[11] Patent Number: 5,298,851

[45] Date of Patent: Mar. 29, 1994

[54] MULTIPLE APPLICATION VOLTAGE REGULATOR SYSTEM AND METHOD

[75] Inventor: Nicholas F. DeNardis, Marshfield, Wis.

[73] Assignee: Transpo Electronics, Inc., Orlando, Fla.

[21] Appl. No.: 881,850

[22] Filed: May 12, 1992

[51] Int. Cl.[5] .................... H02P 9/00

[52] U.S. Cl. .................... 322/28

[58] Field of Search .................... 322/28

[56] References Cited

U.S. PATENT DOCUMENTS

| | | | |
|---|---|---|---|
| 4,262,242 | 4/1981 | Glennon | 322/28 |
| 4,435,676 | 3/1984 | Morishita | 322/33 |
| 4,636,706 | 1/1987 | Bowman et al. | 322/28 |
| 4,680,530 | 7/1987 | Mashino | 322/23 |
| 4,851,818 | 7/1989 | Brown et al. | 340/603 |
| 4,914,374 | 4/1990 | Iwatani et al. | 322/28 |
| 4,937,514 | 6/1990 | Iwatani | 322/33 |
| 4,986,183 | 1/1991 | Jacob et al. | 102/200 |
| 4,994,950 | 2/1991 | Gritter | 363/41 |
| 5,023,539 | 6/1991 | Miller et al. | 322/28 |
| 5,086,266 | 2/1992 | Shiga et al. | 322/28 |
| 5,089,762 | 2/1992 | Sloan | 320/13 |
| 5,140,253 | 8/1992 | Itoh | 322/28 |
| 5,153,498 | 10/1992 | Parro | 322/25 |

*Primary Examiner*—Steven L. Stephan

*Assistant Examiner*—Thomas M. Dougherty

*Attorney, Agent, or Firm*—Allen, Dyer, Doppelt, Franjola & Milbrath

[57] ABSTRACT

A single integrated circuit for multiple vehicle voltage regulator applications is inexpensive, programmable and responsive to mixed signals. The integrated circuit provides both analog and digital functions, and uses a single voltage comparator serving all comparator functions. A variety of features are included with the single integrated circuit in order to permit the programmable, mixed signal and multiple application characteristics of the device. Among the features are the provision for a single voltage comparator that serves all comparator functions, logic gates for preventing the simultaneous activation of fixed reference divider analog switches to eliminate current transients, the use of a single TC diode for thermal shut down and multiple temperature compensation curves with different voltage versus temperature rate of change parameters, a single band gap referenced shunt regulator circuit to serve as both a power source to the integrated circuit and as a precision reference voltage for the comparator, and a selectable load control function to gradually apply the field voltage at a programmable rate consisting of reversible and "up" binary counters with associated logic to prevent abrupt torque loads on the driving engine caused by the activation of electrical loads.

15 Claims, 3 Drawing Sheets

MULTIPLE APPLICATION VOLTAGE REGULATOR SYSTEM AND METHOD

BACKGROUND OF THE INVENTION

With the proliferation of voltage regulator designs, manufacturers and suppliers of compatible voltage regulators are faced with high engineering and tooling costs to accommodate each distinct application. This situation is further complicated by the uncertainty of the need for a particular design, or whether an investment in any design will provide an adequate return. A solution to this dilemma is a design that fulfills a large number of different specialized requirements with a single circuit, with the further advantage of a one time investment in engineering and tooling costs.

One of the key objectives of this invention is a diversified circuit design that will accommodate a variety of voltage regulator applications without compromising individual quality or functionality of each application, while also enhancing reliability. An advantage of providing a single multi-application integrated circuit is that the probability of receiving a return of investment is greatly enhanced in that the cost can be amortized over a greater number of applications.

The following are prior United States patents which are pertinent to the present invention.

| U.S. Pat. No. | Issue Date | Inventor |
|---|---|---|
| 4,143,313 | 3/1979 | Arendt |
| 4,266,181 | 5/1981 | Muto et al. |
| 4,315,205 | 2/1982 | Muri et al. |
| 4,360,773 | 11/1982 | Voss |
| 4,412,169 | 10/1983 | Dell'Orto |
| 4,435,676 | 3/1984 | Morishita |
| 4,459,489 | 7/1984 | Kirk et al. |
| 4,470,003 | 9/1984 | Mitcheil |
| 4,561,036 | 12/1985 | Morishita et al. |
| 4,563,631 | 1/1986 | Mashino et al. |
| 4,629,967 | 12/1986 | Voss |
| 4,629,968 | 12/1986 | Butts et al. |
| 4,636,705 | 1/1987 | Bowman |
| 4,636,706 | 1/1987 | Bowman et al. |
| 4,642,548 | 2/1987 | Mashino |
| 4,672,297 | 6/1987 | Gotoh et al. |
| 4,680,530 | 7/1987 | Mashino |
| 4,727,307 | 2/1988 | Kaneyuki et al. |
| 4,760,323 | 7/1988 | Nadi |
| 4,812,732 | 3/1989 | Iwatani |
| 4,831,322 | 5/1989 | Mashino et al. |
| 4,839,576 | 6/1989 | Kaneyuki et al. |
| 4,914,374 | 4/1990 | Iwatani et al. |
| 4,937,514 | 6/1990 | Iwatani et al. |
| 4,945,277 | 7/1990 | Iwatani et al. |

Attention is given to U.S. Pat. No. 4,636,706 to Bowman et al. This patent teaches a varible duty cycle field excitation waveform which is generated with a down counter periodically loaded with an up-down counter, and with the magnitude of the duty cycle being proportional to the "up" count in the up-down counter. The magnitude of the up count in the up-down counter is transferred into a down counter, the time it takes for the down counter to count down from its orignal value to zero being the duration of the "on" time that the field is excited in relation to the master cycle time.

In contrast, this invention uses a reversible counter in conjunction with a simple binary up counter with the up counter requiring fewer components than the down counter of the prior art. The magnitude of the field excitation is stored in the reversible counter as a down count, and the down count is transferred into the up counter. The time duration of the up counter counting up to zero determines the field excitation duty cycle.

As also discussed in the Bowman et al '706 patent, alternator speed control is obtained by a conventional frequency counter with a fixed time base circuit. This has the disadvantage of eroneously lighting the vehicle warning lamp for at least the duration of the fixed time base if the voltage regulator operation is interupted for some reason.

The circuit design of the present invention measures the time between the successive pulses provided by the alternator stator phase output. These time measurements are compared to a reference time to determine the speed of the alternator. As successive pulse measurement is incorporated, the time required for an accurate measurement is vastly shorter than the frequency counter, therefore, interruptions to this voltage regulator result in an imperceptible flashing of the warning lamp (in the order of microseconds) that is undetectable by the driver.

In the Bowman et al '706 patent, a linear series power supply which is switched on or off is used to provide reference voltages and digital circuit power. In this arrangement, the series pass transistor must absorb the excess voltage and voltage transients requiring a relatively large pass transistor. In switching the digital circuits on and off, inadvertent noise can simulate a switched condition, resetting the digital circuitry resulting in an erroneous flashing of the warning lamp.

In this invention, a shunt voltage regulator is used with the excess voltage and transients being absorbed by a resistor. The digital circuitry is designed using a "no false state allowed" rule that eliminates the need for a master reset. Thus, the circuit design of this invention only switches either on or off, only the peripheral input/output circuitry which unconditionally emulates the turn on or turn off characteristics of the prior art. With said digital circuitry operating continuously and with the lack of false states, this invention is immune to noise induced problems. As the digital circuitry is of CMOS construction the standby current requirements are essentially negligible.

In the Bowman et al, '706 patent, temperature compensation is accomplished with a chip external temperature compensation element. Such elements requiring trimming as an extra production item.

In contrast, this invention accomplishes temperature compensation of varying selectable slopes with a single "on-the-chip" diode. The characteristics of this diode are fixed in the mask of the chip, and avoid the requirement for trimming during manufacture. This diode is also used to shut down the peripheral drive circuits in the event that the alternator operational temperature exceeds a predetermined limit, thereby preventing catastrophic failure.

In the Bowman et al '706 patent, as with other of the cited patent references, a plurality of analog voltage comparators are used to accommodate the various functions required by each specific application. This plurality of comparators also requires individual trimming for each added comparator.

This invention uses a single analog comparator equipped with digitally switched inputs and outputs, which affords the advantage of having only one comparator to trim during the manufacturing operation. The scanning frequency of this comparator is substantially greater than the expected operational speed for any application of the voltage regulator, thereby producing an effective average voltage of each parameter measured. The Bowman et al circuit requires the use of separate analog and digital integrated circuits, whereas, this invention requires a single chip, representing a major saving in manufacturing costs.

The Bowman et al invention also requires different integrated circuits to accommodate different voltage regulator functions. This invention incorporates many different functions that can be selected by different wiring configurations of the respective data inputs. Thus, a relatively inexpensive change to the surface mount ceramic artwork need be only done to accommodate a variety of different applications.

Giving attention to U.S. Pat. No. 4,636,705 to Bowman, there is disclosed a complex voltage doubling scheme to provide the required biasing inherent to typical power MOSFET transistors.

This invention employs two high voltage on-chip FET transistors, three on-chip resistors, one diode, and one capacitor with a feed forward refresh pulse technique to provide adequate biasing required by a Power MOSFET transistor, which is achieved at far lower cost in terms of required circuit elements Giving attention to U.S. Pat. No. 4,672,297 to Gotoh et al, this patent relates to the use of a single diode connected to the junction of the field winding and the field driver transistor. Moreover, by using this diode, an inadvertent short from the output of this diode to ground prevents a full field voltage condition that overexcites the alternator, causing possible damage to the vehicle's electrical loads. However, this diode is also subject to positive battery shorts, and this short condition is made more likely by the extensive use of nonconductive materials in the modern automobile. Such a short to a positive voltage conductor or terminal, either caused by wear or by the process of troubleshooting by an unaware mechanic, may cause excessive current to flow through the now forward-biased diode and through the field driver transistor. The magnitude of the current may be destructive to the field driver transistor, causing a flash through short, causing the damage that Gotoh intended to avoid.

This invention adds a redundant field driver FET transistor that inherently limits the shorted diode current to a safe value. As the addition of this redundant transistor isolates the main drive transistor from any accessible terminal, the shorting of the output diode either to ground or to the positive battery source allows the normal field driver circuitry to operate non-disturbed. As the added redundant FET field driver transistor has inherent current limiting, the removal of the inadvertent short would permit the operation of this circuit to return to normal with no damage.

Attention is given to U.S. Pat. No. 4,831,322 Mashino et al, which discloses another method for generating the high voltages required to operate an N-channel power MOSFET in the common source configuration. The technique disclosed by Mashino et al uses four capacitors, three diodes, a resistor, and five inverters to generate the bias voltage. This circuit is essentially a voltage doubler in which the output is buffered and gated with a ramp generator. This circuit also includes a complex feedback circuit consisting of a differential amplifier, a redundant field MOSFET with current sensing and associated components to track the field driver power MOSFET to the ramp generator. One disadvantage of a circuit of this type is that all the above components are operated at or near twice the battery voltage. If the effects of voltage transients are taken into consideration and in particular, in a vehicle where the battery terminals are corroded, the circuit is susceptible to high voltage breakdown unless expensive components were used. Further, in such a circuit arrangement, the bias voltage generation is independent of the field switching action.

In this invention, the bias voltage generation results directly from the field switch action, achieving a more efficient use of components. Only the essential components are operated at or near twice the battery voltage level to greatly lessen the probability of high voltage transient breakdown. The components that are operated at or near twice the battery voltage receive further protection by the inclusion of current limiting series resistors.

SUMMARY OF THE INVENTION

In consideration of the above and other cited U.S. patents, it is an overall objective of this invention to provide a single intregrated circuit which is inexpensive, programmable responsive to mixed signals and has multiple applications; the single integrated circuit is of high quality and reliability and can be used in a variety of vehicular electrical systems for the purpose of controlling and monitoring the voltage produced by the vehicle's alternator.

From the drawing and the detailed description presented below, it will be understood by those skilled in the art that the present invention is directed to a single integrated circuit that provides: (1) both analog and digital circuit functions on the same integrated circuit chip; (2) a single voltage comparator that can serve all comparator functions; (3) a circuit scheme using logic gates to prevent the simultaneous activation of fixed reference divider analog switches to eliminate current transients; (4) a single TC diode for thermal shutdown and multiple temperature compensation curves with different voltage versus temperature rate of change parameters; (5) a single band gap referenced shunt regulator circuit to serve as both a power source to the integrated circuit embodied analog and digital circuits and as a precision reference voltage source for the voltage comparator circuits; (6) a unitized voltage doubler and field-driver circuit of simple and reliable operation, with voltage doubler disablement characteristics to impel a variety of discrete field driver circuits; (7) a hardwired programmable decoder that selects a variety of circuit constants to fulfill the requirements of a wide diversity of voltage regulator applications; (8) a stator phase input circuit that is programmable to function with either AC or DC signals; (9) a digital low pass filter to restrict circuit activation by false logic signals; (10) a speed detector circuit that responds rapidly to changes in alternator speed to prevent false warning lamp activation; (11) a load control circuit that uses a reversible counter in junction with an "up" counter and associated circuitry to provide programmable rate of change field voltages and disablement; (12) a power supply system that continuously powers key logic and analog circuitry to accommodate fast circuit startup for prevention of false warning lamp illumination; (13) a system of logic interconnection wherein no logic fault states exist eliminating the need and dependence on a so-called master or initial reset; (14) a circuit scheme wherein circuit functions are selected by a hardwired decoder to activate a warning lamp in a predetermined method to serve the requirements of specific applications; (15) an integrated circuit embodied resistor method that cancels the effects of resistance variation caused by etching and temperature digressions; (16) a field monitoring method wherein inadvertent shorts of such a field monitoring terminal to either the battery or ground voltage levels has no affect on the operation of the main field circuit and causes no damage to the components making up the field monitoring circuit, with the circuit resuming normal operation after the short is removed; (17) a method for driving a variety of field circuits of "A", "B", or isolated field winding connected types; and (18) a method of complying with stator phase voltages of either delta or wye connected types.

THE DRAWING

FIG. 1 is a schematic interface drawing showing representative circuits connectable to a mixed signal custom ASIC, and in which:

FIG. 1*a* is an embodiment using a delta connected stator with stator phase output.

FIG. 1*b* is an embodiment using is a wye connected stator with stator neutral phase output.

FIG. 1*c* is an embodiment using an "A" connected field circuit with a Darlington connected NPN bipolar field driver transistor.

FIG. 1*d* is an embodiment using a "B" connected field circuit with a Darlington connected PNP bipolar field driver transistor.

FIG. 1*e* is an embodiment using a "B" connected field circuit with a N-channel power MOSFET field driver transistor connected as a source follower.

FIG. 1*f* is a schematic illustrating mixed signal custom ASIC integrated circuit with peripheral discrete components in accordance with the present invention.

DETAILED DESCRIPTION

The following discussion assumes that the reader has a basic understanding of the manner of operation for basic electronic circuit components, such as transistors, resistors and capacitors.

CIRCUITS OF FIG. 1

Figures 1A, 1B, 1C, 1D, 1E, 1F:
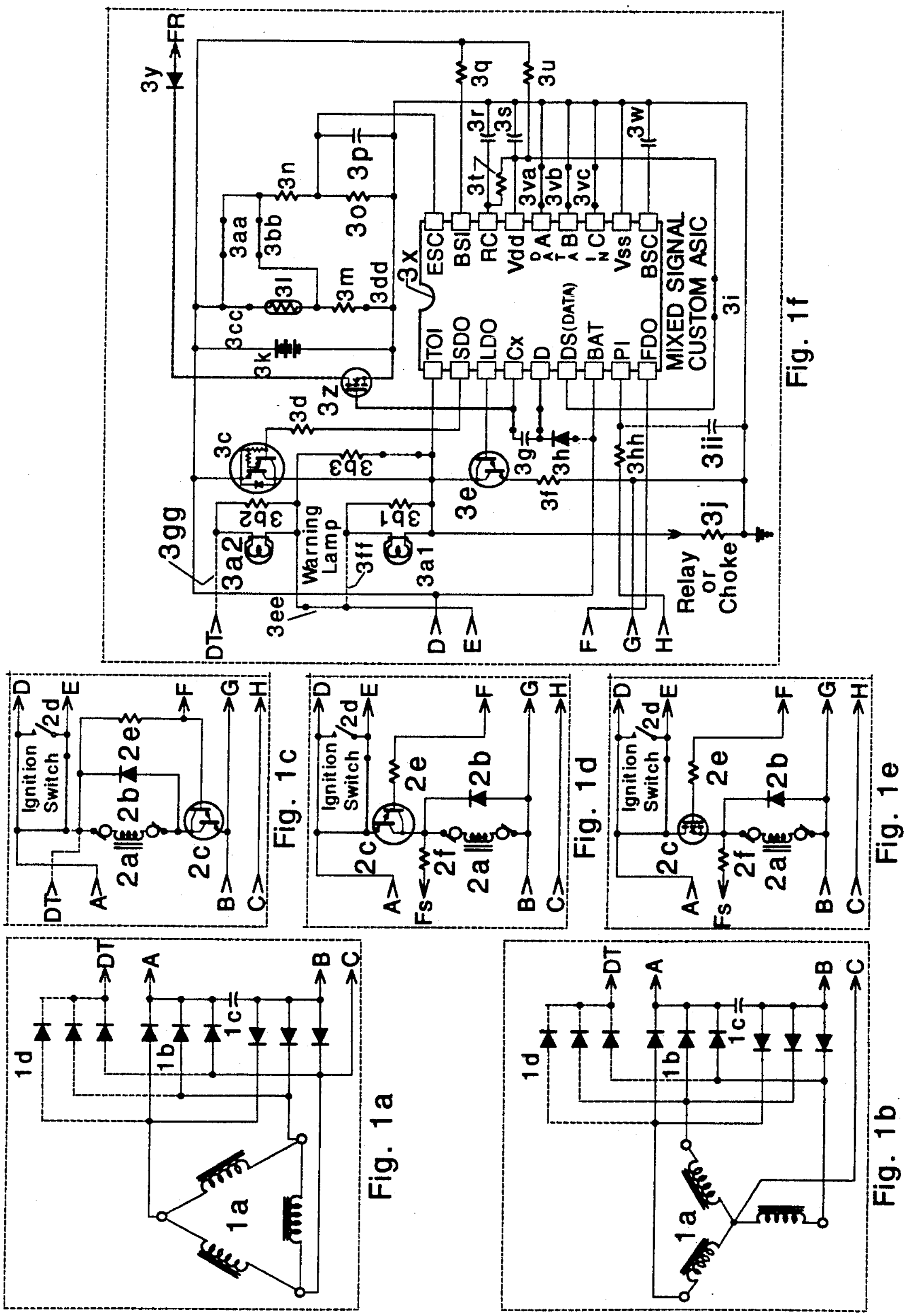

FIG. 1 is a composite drawing depicting representative applications with which the mixed signal application-specific integrated circuit ("ASIC") 3*x* of FIG. 1*f* is designed to work. FIG. 1*a* shows a well-known delta connected stator 1*a*, with the accompanying diode rectifiers 1*b* and the noise suppression capacitor 1*c*. The stator phase output at "D" is a square wave voltage nearly equal in peak amplitude to the average voltage developed at output "A". The frequency of the stator output "C" is equal to the number of stator poles times the number of revolutions the field coil 2*a* shown in FIGS. 1*c*, 1*d*, or 1*e* is rotated per second. The engine rotating said field coil is not shown. The basic stator circuit of FIG. 1*a* may or may not be equipped with the auxiliary diodes 1*d*. The auxiliary diodes 1*d*, commonly referred to as the diode trio in the trade provide an isolated energy source for the field circuit as one means of avoiding field current through the ignition switch 2*d* of FIG. 1*c*.

FIG. 1*b* is identical to FIG. 1*a* with the exception that the three stator coils Ia are connected in the wye configuration. The neutral wye phase output "C" is also a square wave of the same frequency as the delta connected stator as shown in FIG. 1*a*, but the peak amplitude of the square wave at terminal "C" in FIG. 1*b* is nearly ½ of the average voltage appearing at the output terminal "A" in FIG. 1*b*.

FIG. 1*c* shows a version of the field circuit. With terminal "B" grounded, one end the field winding 2*a* is connected to the ungrounded main or auxiliary rectifier output. This connection is normally made internally in the alternator and in the trade is called an "A" type field circuit. The field winding switching transistor 2*c* can either be a Darlington connected NPN bipolar transistor as shown in this figure or it can be an N-channel power MOSFET type transistor. If transistor 2*c* is of the bipolar NPN type, this transistor will be provided with internally connected base to emitter resistors, these resistors are not shown for simplicity. Resistor 2*e* provides the bias current for transistor 2*c*.

Diode 2*b* is called the flyback diode in the trade and serves a bilateral function. The first is to control the magnetic collapse rate of the field winding 2*a* to limit the BEMF voltage which would be otherwise destructive to the field transistor 2*c*. The second is to average the current flowing through the field winding 2*a*. By way of example, if transistor 2*c* were conductive 50% of the time with conduction causing 2 amperes of peak current through 2*c* in series with field winding 2*a*, the off time of transistor 2*c* would result in an average current of 1 ampere in the series circuit of field winding 2*a* and diode 2*b*.

Transistor 2*c* functions as a switch which in certain applications would be either hard on or hard off. The advantage of operating transistor 2*c* as a high speed switch is that the power dissipation of transistor 2*c* will be at a minimum lessening the heat sink requirements. The disadvantage of operating transistor 2*c* as a high speed switch is that more noise is introduced into the system which may have adverse effects on the vehicle's communication or computer electronics due to the high rate of change of the field current. In practice, the selection of transistor 2*c* and associated circuitry would depend upon the application, with the extremes being a high speed switch for minimum power dissipation or a low speed switch by using a transistor with high interelectrode capacitance. The distributed capacitance of transistor 2*c* may be augmented with external lumped capacitance.

In the configuration of FIG. 1*c*, jumper 3*i* in FIG. 1*f* would be opened to provide the correct phasing to transistor 2*c*.

The field supply source of FIG. 1*c* can be implemented in a number of different ways, either directly to the vehicle's battery, directly to the battery via the ignition switch 2*d*, or directly to auxiliary diodes at terminal "DT" depending on the application. If the field supply source is a direct connection to the battery, a PNP bipolar transistor with emitter connected to battery and collector connected to the top of resistor 2*e* is added to cut off the biasing current through resistor 2*e*. This is necessary to reduce standby current when the vehicle is not running. In this instance the jumper 3*i* of FIG. 1*f* will be closed to provide correct phasing.

FIG. 1*d* shows a version where one end of the field winding 2*a* is internally connected the negative terminal of the alternator. If the negative terminal is ground, FIG. 1*d* would be called a "B" field connection in the trade. Transistor 2*c* is shown as a bipolar Darlington connected PNP with internally connected base-emitter resistors (not shown), transistor 2*c* can also be a P-channel power MOSFET type. Resistor 2*e* limits the base current of transistor 2*c*. The field supply source can be varied such as in FIG. 1*c*, but only the "A" connection is shown for simplicity. That is, the field supply source can be from either the battery, ignition switch, or the "DT" terminal of FIGS. 1*a* or 1*b*. Resistor 2*f* may be added as a means to test the integrity of the alternator circuit independent of the integral voltage regulator for safe trouble diagnosing without the consequence of over driving the field circuit. The same switching characteristics as presented in FIG. 1*c* apply in this figure with the exception that the field driver is a PNP instead of an NPN. Jumper 3*i* in FIG. 1*f* will be closed for the correct phasing in this figure.

FIG. 1*e* shows a "B" type field connected circuit using a N-channel power MOSFET type transistor 2*c* connected in the common source configuration. In the common source connection as shown in FIG. 1*e*, the N-channel power MOSFET requires that the gate voltage be greater than either its source or drain voltage to cause transistor 2*c* to saturate. The saturation characteristic is necessary to provide near battery voltage (3*k* of FIG. 1*f*) across field winding 2*c* to limit the power dissipation of transistor 2*c*. As terminal "D" of FIG. 1*e* is connected directly to the battery, the battery voltage is the greatest voltage available in the system. It is, therefore, necessary to provide a multiple of this voltage for proper biasing of transistor 2*c*. This is accomplished by adding a capacitor 3*g* and a diode 3*h* to the Mixed Signal Custom ASIC 3*x* as shown in FIG. 1*f*. The addition of these two components causes the "FDO" output pin of 3*x* in FIG. 1*f* to swing from near ground to almost twice the battery voltage. Resistor 2*e* of FIG. 1*e* serves to limit the gate-source break down current of transistor 2*c* to protect transistor 2*c* from voltage transients. Resistor 2*e* also reacts with the gate to source capacitance of transistor 2*c* to form a low pass filter. This filtering action reduces the rate of change current through field winding 2*a* to limit transients inherently produced by switching inductive loads. Resistor 2*f* may be added as a test terminal to check the integrity of the field circuit without overdriving the field circuit.

As in FIGS. 1*c* and 1*d*, the drain of transistor 2*c*, FIG. 1*e*, can either be connected directly to the battery as shown, or either to the ignition switch 2*d* or directly to the "DT" terminal of FIGS. 1*a* or 1*b* depending upon the application.

FIG. 1*f* shows the wiring options for the Mixed Signal Custom ASIC 3*x*. Starting at pin "TOI" on 3*x*, "TOI" requires an input current whenever charging system operation is desired. This input current is controlled by the ignition switch which provides battery voltage to terminal "E" in FIG. 1*f*. This startup input current can flow either through lamp 3a1 or resistor 3b1 or the combination of 3a1 in parallel with 3b1. An alternative path exists through resistor 3b3 if lamp 3a1 or resistor 3b1 is not required for the particular application.

Pin "SDO" of 3*x* outputs a low whenever all charging system functions are normal. In particular, a phase signal is present at pin "PI" of 3*x* of sufficient frequency and amplitude, the connections within the system are normal, and the key operating voltages are normal. Pin "SDO" can be ignored or unterminated in certain applications. Where required, pin "SDO" can drive either a P-channel power MOSFET transistor or a PNP Darlington transistor as denoted by part 3*c* in FIG. 1*f*. Resistor 3*d* limits the biasing current fed to the base of transistor 3*c*. With all systems normal, transistor 3*c* will provide near battery voltage to either a control relay, choke heater resistor, or to another controller as represented by part 3*j* in FIG. 1*f*. The devices represented by part 3*j* are electrical in nature and have their operation limited to only when the charging system is operating normally. Such devices may be large electrical loads such as electric window defrosters, blower motors, or the choke heater as mentioned previously. The purpose of pin "SDO" of 3*x* and associated circuitry is to conserve on battery energy during engine cranking and starting by disabling said electrical loads. These same electrical loads will also be disabled in the event of charging system failure.

Terminal "LDO" of 3*x* outputs a current suitable for driving a NPN transistor whenever the charging system diagnostic circuits detect a failure condition or when the ignition switch is closed and the alternator is not being rotated. In such a state, transistor 3*e* is conductive illuminating warning lamp 3a1. Resistor 3*f* in the emitter circuit of transistor 3*e* limits the maximum current of transistor 3*e* and assures that the collector voltage of 3*e* will be of sufficient magnitude to not conflict with the voltage on terminal "TOI".

Terminals "Cx", "D" and "BAT" of 3*x* accept the electrodes of the voltage doubling components capacitor 3*q* and diode 3*h*. Voltage doubling is only used when the field driver transistor is a common source connected N-channel power MOSFET. For all other field driver applications, capacitor 3*g* and diode 3*h* are omitted from the circuit. The "BAT" terminal will always be connected to the positive terminal of the battery 3*k* for operation of the field predriver circuits. Terminal "Cx" can also be used to drive a field driver redundant transistor 3*z*. Transistor 3*z* is selected to provide an ample sinking current through diode 3*y* before it enters the current limiting mode. In applications requiring field driver-field winding monitoring, an output terminal of a field rectifier 3*y* can either be inadvertently shorted to the positive terminal of battery 3*k* or to the negative terminal of battery 3*k* without interfering with the operation of the voltage regulating system. Only the operation of the monitoring device will be affected by said short. Circuit operation will return to normal without damage to said components after the short is removed.

Terminal "DS" of 3*x* is a data input terminal. This terminal is either connected to the "Vdd" terminal of 3*x* or is left open. The action of connecting or not connecting terminal "DS" to terminal "Vdd" is to change the phase of the field predriver circuits located internally in the integrated circuit 3*x* by 180 electrical degrees. This feature permits integrated circuit 3*x* to drive different configured field driver circuits.

Terminal "PI" of 3*x* is the stator input terminal. Resistor 3*hh* limits the negative transient current flowing into "PI" of 3*x* due to the ESD substrate diode internal to integrated circuit 3*x*. Terminal "PI" can be either programmed for an AC voltage which will only respond to voltage variations, or to a DC level dependent on the specific application. Capacitor 3*ii* is added to the circuit of FIG. 1*f* if the application requires a DC level detection to integrate the stator phase signal. Said capacitor 3*ii* is not used in AC coupled applications. Terminal "PI" monitors the existence of the proper voltage at the stator phase and/or redirects the stator phase signal to the speed detection circuitry within integrated circuit 3*x* when called for by the program.

Terminal "FDO" of 3*x* is the field driver output terminal. The nature of this terminal is either that of a high voltage or a high current logic signal for accommodating different field driver configurations. When the input to terminal "TOI" is low, the output of terminal "FDO" will be of a high impedance to effectively disable the field driver circuit with terminal "DS" connected to terminal "Vdd" of 3*x*. When the input to terminal "TOI" is low, the output of terminal "FDO" will be of a low impedance to effectively disable the field driver circuit with terminal "DS" not connected to terminal "Vdd" of 3*x*.

Terminal "BSC" of 3*x* provides a conduction path for a filtering capacitor 3*w* that is too large to be mounted on integrated circuit 3*x*.

Terminal "Vss" of 3*x* combines the function of providing the negative reference voltage required by integrated circuit 3*x* and provides the negative power supply return path for integrated circuit 3*x*. Due to the low power requirements of integrated circuit 3*x*, the negative reference and power supply return voltages are nearly equal permitting a single terminal to serve both functions.

Terminals "A", "B", and "C" of 3*x* are programming input terminals. The input into these terminals is either a connection to terminal "Vss" or no connection whatsoever. By varying which of these terminals are connected to "Vss" or left open in a progressive binary fashion, it will be noted that eight different combinations exists. The effect of hardwiring different codes into these three pins is to either select or deselect various circuits internally located on integrated circuit 3*x*. By hardwiring various codes into these three data input terminals, the integrated circuit 3*x* will be programmed for different charging system functions. In this manner, a single custom designed mixed signal integrated circuit 3*x* can serve a multitude of different applications.

Terminal "Vdd" of 3*x* is the positive power supply input terminal and also is the positive reference voltage terminal of integrated circuit 3*x*. Due to the low power requirements of integrated circuit 3*x*, the power supply voltage is nearly equal to the reference voltage, therefore, this single terminal can serve both functions. Terminal "Vdd" of 3*x* is the high end of an internally located shunt regulator. Resistor 3*u* mounted external to the integrated circuit 3*x* is the series dropping resistor for this shunt regulator. Due to the fast response of the shunt regulator, resistor 3*u* will develop any transient or excess voltages that may be encountered in the charging system power bus conductors, therefore keeping these voltages away from the integrated circuit mounted shunt regulator. Capacitor 3*s* forms a long time constant charge circuit with resistor 3*u* to further limit transient voltages between terminals "Vdd" and "Vss" and acts as a low impedance return path between these two terminals to provide a conductive path for integrated circuit 3*x* switching currents. Due to the internal circuit construction of integrated circuit 3*x*, terminal "Vdd" of 3*x* can directly withstand nominal charging system voltages without either the protection offered by resistor 3*u* or capacitor 3*s* to provide an added degree of reliability.

Terminal "RC" of 3*x* provides a conduction path to an integrated circuit external resistor-capacitor network. Said network of resistor 3*t* and capacitor 3*r* providing a time constant of a predetermined period for the purpose of setting the clock frequency of an integrated circuit 3*x* mounted oscillator. Resistor 3*t* and capacitor 3*r* are as such to be stable in initial values over a wide range of operating temperatures.

Terminal "BSI" of 3*x* provides a conductive path through resistor 3*q* for the purpose of monitoring the battery voltage. Changes in the battery voltage indirectly applied to this terminal result in activity within the integrated circuit 3*x* which will be clearly defined in the section under the FIG. 2 heading. Resistor 3*q* is added as a trimming resistor and is as such to be laser trimmed to a precise value for means of adjusting the resultant voltage at terminal "BSI" to a very precise value.

Terminal "ESC" of 3*x* is the recipient of a divided down voltage sourced from a remote location of the voltage regulator circuit. Said source voltage being of a preferred value that the voltage regulator circuit will regulate to. Associated circuitry shown in relationship to terminal "ESC" is optional and is only functional for a given set of codes hardwired to pins "A", "B", and "C" of integrated circuit 3*x*. For a given set of codes, the trip voltage of terminal "ESC" may vary in a prescribed way with temperature. For another set of codes, the trip voltage of terminal "ESC" will be nearly constant with temperature. Therefore, whether terminal "ESC" functions at all, or precisely how this terminal will function with temperature is dependent on the precise coding of terminals "A", "B", and "C". If the codes are as such to render terminal "ESC" as non-functional, components 3*o*, 3*p*, 3*n*, 3*m*, and 3*l* would serve no purpose and would be omitted from the circuit of FIG. 1*f*. Such would be the scenario if local sensing only is the requisite for the specific application. If the codes are as such to cause the trip voltage of terminal "ESC" to vary in a prescribed method with temperature, components 3*l* and 3*m* would be omitted from FIG. 1*f*. Components 3*n* and 3*o* would be therefore, be connected across battery 3*k*. Jumpers 3*bb* and 3*cc* will be omitted and jumper 3*aa* will be made conductive. Components 3*n* and 3*o* are laser trimmed to provide a precise battery 3*k* division to terminal "ESC" of 3*x*. Capacitor 3*p* integrates fluctuating voltages and in particular voltage transients that may be developed across resistor 3*a* to a net averaged voltage. Components 3*n*, 3*o*, and 3*p* are located in close proximity to integrated circuit 3*x* and are constituents of the voltage regulator unit. Such would be the scenario if voltage regulator internal temperature compensation with remote battery voltage sensing is the requisite of the specific application. If the hardwired codes to terminals "A", "B", and "C" are as such to cause the trip voltage of terminal "ESC" to be nearly constant with temperature and remote temperature compensation is a requisite of the specific application, all of the components associated with terminal "ESC" will be present in the charging system circuit. Thermistor 3*l* will be physically located in close proximity to battery 3*k* to reflect an accurate status as to the precise temperature of the battery. The other associated components will be located within the confines of the voltage regulator unit. Jumper 3*aa* will be omitted and jumper 3*bb* and 3*cc* will be made conductive. Thermistor 3*l* will change the voltage across resistors 3*a*, 3*m*, and 3*n* with temperature. For the specific application, resistors 3*o* and 3*n* are laser trimmed to the precise division ratio, and resistor 3*m* is laser trimmed to match the terminal impedance of the series resistors 3*n* and 3*o* for the precise interaction with thermistor 3*l*.

Lamp 3a2 of FIG. 1*d* alone, or in parallel with resistor 3b2 provides an alternative method of monitoring the charging system integrity and is used in less sophisticated charging system applications. Such a charging system is typified in an alternator equipped with auxiliary diodes as shown by 1*d* in FIGS. 1*a* or 1*b*. The low side of lamp 3a2 is connected to FIG. 1*f* reference point "E". The FIG. 1*f* reference point "E" is connected to reference point "E" of one of the three shown field driver circuits of either FIGS. 1*c*, 1*d*, or, 1*e*. As indicated in the said figure, the low side of lamp 3a2 will be connected to the positive terminal of the battery 3*k* only when the ignition switch 2*d* of FIGS. 1*c*, 1*d* or 1*e* is made conductive. In this application, the jumper on the low side of the ignition switch making contact with the high side of field winding 2*c* in any of the field driver figures will be omitted, the DT jumper to field winding 2*a* as shown in FIG. 1*c* will be made conductive. The DT connection is not shown in FIGS. 1*d* and 1*e* for simplicity. As the schematically high side of lamp 3a2 is also connected to said "DT" reference point, when the alternator is in the stalled state, the only source of field voltage to the high side of field winding 2*c* is through lamp 3a2. Lamp 3a2 will therefore illuminate. If the charging system is operating normally, the voltage at reference point "DT" will be nearly equal to the voltage at the positive terminal of the battery 3*k*, setting the differential voltage across lamp 3a2 nearly equal to zero, therefore extinguishing lamp 3a2.

The circuits of FIG. 1 appear to be component extensive as many circuit variations are simultaneously presented to depict the diversity of integrated circuit 3*x* of FIG. 1*f*. In practice, only the required components would be mounted on a thick film substrate, customed designed for the specific application. The relative cost of the thick film design is insignificant compared to the cost for the design of the integrated circuit. As the integrated circuit 3*x* of FIG. 1*f* can be used in many applications, this integrated circuit can be purchased in large volumes thereby substantially reducing unit cost.

Figure 2:
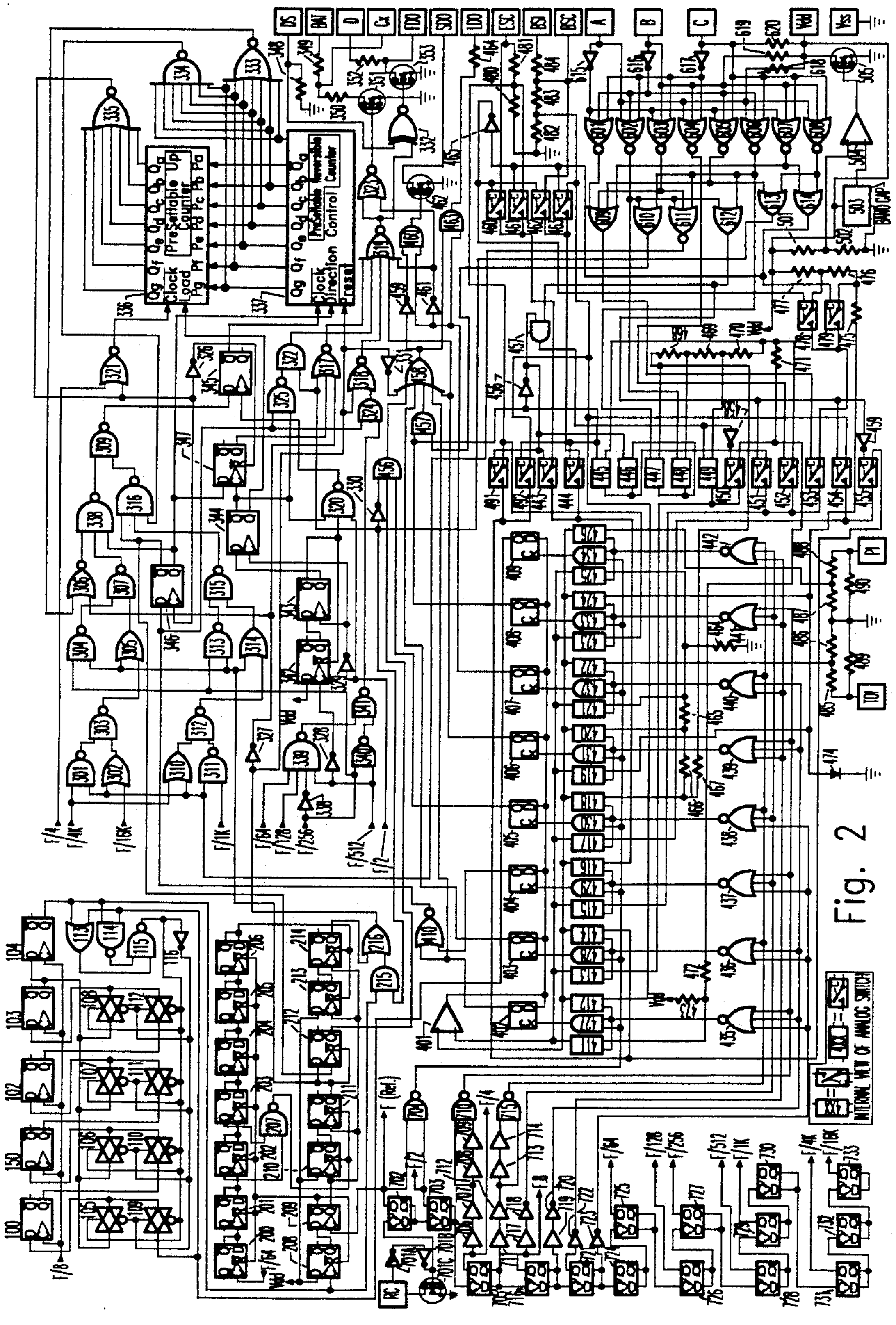
FIG. 2 is a schematic illustrating one embodiment of the integrated circuit forming the mixed signal custom ASIC of FIG. 1.

Circuits of FIG. 2

The circuits of FIG. 2 are grouped by reference number, whereby the reference numbers are in multiples of one hundred.

Group 500 depicts an integrated circuit embodied shunt voltage regulator circuit. The regulated voltage produced by this circuit is used to power all of the digital and analog circuitry of FIG. 2. This regulated voltage moreover, serves as the reference voltage for fixed divider resistors 464 through 473 and temperature compensation divider consisting of components 474 through 477. An independent sampling divider consisting of resistors 501 and 502 is incorporated for operational amplifier 504. A resistor could have been saved by incorporating an additional tap on fixed string 464–473, but said fixed string is subject to minor switching noise generated by distributed capacitance and the high speed analog switches 411–426, such noise would be vexatious if permitted to be amplified by operational amplifier 504. The noise voltages produced by resistors 464–473 have no effect on their associated circuits as the logic offers a quiet time before any decision is made. Band gap reference 503 is an extremely temperature independent voltage reference that is equipped with an in process adjustable network to provide a voltage that is precise in value and stable with temperature. The characteristics of the integrated circuit embodied resistors are discussed later. Operational amplifier 503 is carefully designed with limited gain to provide fast response without oscillation. The difference voltage of the band gap and resistive divider is amplified by said operational amplifier and used to control the bias on a chip embodied field effect transistor 505. The conduction of said FET being proportional to the voltage level of "Vdd". FET 505 is designed to withstand voltage and currents far in excess of what would be considered the normal operating conditions. Not shown in FIG. 2 are substrate bypass capacitors distributed throughout the Vdd and Vss bus lines embodied in the chip. Any voltage greater than Vdd is consumed by an inexpensive chip external resistor 3*u* in FIG. 1*f*. It should be noted that the circuit of FIG. 2 is predominately of the CMOS technology which is characterized by very modest power requirements. As the circuitry of FIG. 2 has very modest power requirements, the circuitry is made to operate the instant the voltage regulator equipped alternator is connected to the vehicle battery. Only the peripheral output circuits are controlled by the ignition switch emulating full voltage regulator turn on and off power characteristics. The logic of FIG. 2 is intentionally designed with zero false states, therefore, a master reset is not required nor desired. The worst case scenario for a noised induced undesired state is quickly corrected by the continuous cycling of the logic and will go unnoticed by both the charging system and the vehicle operator. In this manner, a chip embodied power regulator, of practically zero cost, provides an extremely stable power and reference supply source, which is well protected against voltage transients to accommodate the requisites of precision, reliability, and low cost.

Group 700 generates the reference frequencies used for timing and control for the remainder of the circuits shown in FIG. 2.

Terminal RC of FIG. 2 is the recipient of the RC timing network. As the capacitor 3*r* charges through resistor 3*t*, both of FIG. 1*f*, a voltage is reached that trips Schmitt trigger 701A in FIG. 2. Schmitt trigger 701A is a custom designed circuit that has precise upper and lower trip points that remain stable over the operating temperature range. As the input of Schmitt Trigger 701A rises above the upper trip point, the output of 701A quickly snaps to a logical "0" output. This output is inputted to inverter 701B which applies a conductive bias to field effect transistor 701C. 701C, in a conductive state discharges capacitor 3*r* of FIG. 1*f*, from thence forward, this cycle repeats itself to generate an oscillatory waveform that triggers flip flop 702.

Flip flop 702 with the remaining flip flops in the seven hundred series are of the positive edge triggered "D" input type which are connected in a ripple or sequential fashion. The Not Q side of each flip flop is used to trigger the successive flip flop in the chain to emulate negative triggered flip flops.

The ripple counter connection is the most component efficient method of generating a binary frequency divider function, but has the disadvantage that flip flops located further down the chain change state a multiple of their propagation time for each division. As other circuits in FIG. 2, in particular the 400 series, require a synchronized waveform to prevent the simultaneous activation of rival gating networks which causes false states and noise introduction, a method of synchronizing the shift states of the ripple counter is incorporated.

Using binary counter gates 722 and 723 as the reference, flip flop 721 will change state one time period later than flip flop 716. Flip flop 716 is outputted through buffers 717 and 719 before switching inverters 718 and 720 to compensate for this one time period delay. Therefore, the transition from low to high or from high to low of inverters 718 and 720 will occur at nearly the same time as inverters 722 and 723.

Flip flop 721 will change state two time periods after flip flop 705. The outputs of flip flop 705 are delayed with two cascaded buffers 706 and 707 on the Q side and 711 and 712 on the not Q side. The outputs of buffers 707 and 712 will switch at nearly the same time as buffers 717 and 719 and flip flop 721 to synchronize the switching action.

The output of buffer 707 is applied directly to NAND gate 710. Buffers 708 and 709 delay the switching instant of buffer 707 by two more time periods and apply this delayed signal to the remaining input of NAND gate 710. This circuit configuration results in an output waveform of NAND gate 710 that only has its negative going transition delayed without delaying the positive transition.

The output of buffer 712 is applied directly to NAND gate 715. Buffers 713 and 714 delay the switching instant of buffer 712 by two more time periods and apply this delayed signal to the remaining input of NAND gate 715. This circuit configuration results in an output waveform of NAND gate 715 that only has its positive going transition delayed without delaying the negative transition.

The restructured wave forms of the binary frequency divider circuit can be appreciated by examining NOR gates 435 through 442. These NOR gates 435–442 will each output a logical high when each of the three inputs are all at a logical low. The formal symbol of NOR gates 435–442 would be a de Morgan NAND gate representation of negative logic, but such a gate in reality is the generic NOR gate. The generic NOR gate is preferred in this figure as it leaves no doubt as to the precise nature and the logical function of this circuit.

The action of delaying both the leading and trailing edges and just either the leading edge or just the trailing edge of the binary divider is to permit only one of the decoding NOR gates 435–442 to output a high at any time. NOR gate 435 will output a high for a specific duration, then NOR gate 435 will output a low before any other decoder gates 436–437 is permitted to go high. This action results in a dead zone between the successive enabling of the decoder gates. In actual operation, if NOR gate 435 is enabled, its output will go low before successive NOR gate 436 is enabled so between the time that 435 and 436 are successively enabled, all of the decoding NOR gates 435 through 442 will be disabled. When NOR gate 436 is turned off, NOR gate 437 is turned on after the dead zone time has elapsed. This progression repeats through each successive NOR gate until NOR gate 442 is enabled at which time, NOR gate 435 is enabled to repeat the cycle. As these NOR gates successively activate analog switches which connect different taps of a common resistive divider, if any two rival analog switches are enabled simultaneously, a short circuit would appear across a portion of the divider resulting in a brief, but disturbing current spike.

The analog switches of FIG. 2, namely 411 through 426, 443 through 455, 460 through 463, and 491 through 492 are symbolized by function to ease circuit tracing of FIG. 2. The symbol of said analog switches shows a simple form "A" switch that is in the closed position or in the conductive state if the analog symbol "C" terminal has a logical high inputted or is in the open or non-conductive state if said "C" terminal has a logical low inputted. To emulate the symbolic function, each symbolized analog switch would need a back to back connected N and P channel FET transistor controlled by at least one inverter to emulate the single "C" terminal function. In the actual circuit, analog switches such as 411 and 412 are always controlled concurrently, therefore a single inverter would serve to control both switches of 411 and 412. While the single inverter version requires less silicon and is the preferred method in the actual physical circuit, the schematic representation would require that an additional inverter be drawn for each analog switch pair plus the additional control lines. The drawing in FIG. 2 would be vastly more complicated if all the analog switches were drawn in actual form. Therefore, it is to be understood that the analog switch symbol as shown in FIG. 2 is drawn for simplicity, and provides a functional description of the circuit more so than the actual physical implementation.

AND gate 704 combines the outputs of flip flop 702 and flip flop 703. As the output of flip flop 703 is twice the wavelength of flip flop 702, AND gate 704 will only pass every other cycle of flip flop 702. The output of AND gate 704 eventually is used to trigger flip flops 402 through 409. These flip flops respond to the leading edge of AND gate 704. Flip flop 702 will output two leading edge pulses during one clock period of flip flop 703. The action of AND gate 704 is to only pass the second leading edge pulse of flip flop 702. Using the clock period of flip flop 703 as the reference, $\frac{3}{4}$ of the time will pass before AND gate 704 will output the leading edge.

By way of example, NOR gate 435 will be enabled for "X" micro-seconds. The output of NOR gate 435 enables AND gate 427 and analog switches 411 and 412. Analog switches 411 and 412 Connect voltage points to voltage comparator 401. As voltage comparator 401 is an analog device, it has a finite response time. Analog switches 411 and 412 connect voltages from a high impedance source to conserve on current drain. Integrated circuit represented by all of FIG. 2 has distributed capacitance. With these considerations, for a clock period of "X" micro-seconds, the leading edge pulse originating from AND gate 704 is made to occur "0.75 X" micro-seconds after NOR gate 435 was enabled. This action devotes 75% of the clock time to permit the circuit to settle before the next action occurs which stores the voltage comparator 401 data during this clock period.

The binary divider selects NOR gate 435 which enables analog switches 411 and 412; and AND gate 427. Dependent on which analog switch voltage is more positive, voltage comparator 401 will respond with either a digital high or low output voltage. The output of voltage comparator 401 is directed to the "D" inputs of flip flops 402 through 409. When 75% of NOR gate 435 enabling time has elapsed, AND gate 704 will output a leading edge pulse to AND gates 427 through 434. As only AND gate 427 is enabled at this time, AND gate 427 will pass the leading edge pulse from AND gate 704 to flip flop 402. Flip flop 402, therefore, will store the data as if the voltages applied to analog switches 411 and 412 had their own voltage comparator.

Voltage comparator 401 has built in hysteresis to prevent oscillations, is composed of field effect transistors with extremely high input impedance, and is the only analog comparator in the integrated circuit as shown in FIG. 2. As voltage comparator 401 is the only comparator, the operation of adjusting for the offset voltage is only required once.

NAND gates 710 and 715, inverters 718, 720, 722, and 723 Compensate for the propagation delay time imposed by the addition of AND gate 704. Without this compensation, the unwanted leading edge pulse applied to the input of AND gate 704 may be passed to falsely trigger flips flops 402 through 426. The added logic in the 400 and 700 groups only uses about 10% of the silicon are used by the single voltage comparator 401. As FIG. 2 has effectively eight voltage comparator functions, a savings of about 86% in silicon is realized over using individual comparators. Each voltage source requiring comparison is sampled thousands of times per second, effecting the characteristic of using individual comparators. As all the circuits of FIG. 2 are etched simutaneously on a single silicon chip, the relative propagation times of the individual gates are equalized to prevent any logic "race" conditions that could occur with independently varying delay times. As the impedance of voltage comparator 401 is extremely high, analog switches 411 through 409 and analog switches 443 through 455 do not pass any appreciable current, therefore these switches can be fabricated with minute field effect transistors for a further savings in silicon area.

From this point forward, comparator functions will be presented as inputs to analog switch pairs (411 and 412, 413, and 414, etc.), with the even component number considered as the positive input and the odd component number being considered as the negative input. The output of the comparator functions will be from flip flops 402 through 409, where flip flop 402 corresponds to analog switch inputs 411 and 412, etc.

An individual NOR gate (de Morgan negative logic NAND gate equivalent), is enabled from decoder NOR gates 601 through 608 by the hardwiring of integrated circuit terminals "A", "B", and "C". If the three data input terminals are left open, pull-up resistors 618, 619, and 620 will output a logical high into inverters 615, 616, and 617. These inverters will, therefore, all output a low. As only NOR gate 601 is wired directly to inverters 615, 616, and 617, only inverter 601 will output a high, inverters 602 through 608 will all output a logical low. In a similar manner, any one NOR gate of NOR gates 601 through 608 can be enabled by grounding a corresponding combination of terminals "A", "B", and "C", the NOR gate being enabled that is wired to the combination of inverter outputs 615, 616, and 617 and pull-up resistors 618, 619, and 620 that is concurrently producing a logical low output. In this manner, only one NOR gate of NOR gates 601 through 608 is enabled at any particular time.

If NOR gate 601 is selected by the hardwired process previously described, equal consideration is given that NOR gates 602 through 608 were not selected. As made evident by tracing the output of NOR gate 601 into OR gate 609, OR gate 609 will pass the logical high from NOR gate 601 to analog switch 453. Analog switch 453 is the recipient of the output from either analog switch 478 or 479, but neither NOR gates 607 or 608 were selected, therefore analog switch 478 will be made conductive as its control originates from inverter 465, the inverted output of ORed gates 607 or 608, and analog switch 479 will be made non-conductive, as its control originates from the true output of OR gate 614. In this manner, precise circuit parameters, exclusive to the specific application, can be selected by hardwiring terminals "A", "B", and "C" in a specified binary format. As terminals "A", "B", and "C" are provided with integrated circuit mounted pull-up resistors 618, 619, and 620, a logical high input to these terminals simplifies to leaving the specified data input terminals as an open circuit, and a logical low input simplifies to connecting the specified data pins to Terminal "Vss" of FIG. 2. Terminal "Vss" of FIG. 2 is physically placed adjacent to the three data input pins to simplify the thick film conductive layout.

The reference voltages for comparator 401 are developed by two major divider strings. The first string, hereby called the fixed string, as the divider voltages are constant with temperature, starts at Vss with resistor 464 and progresses toward Vdd with the resistors ascending in part number value in numerical order through resistor 473 which terminates the string at Vdd.

The second reference string has a temperature variable element and is hereby called the TC string. This string starts at Vss with diode 474 and progresses toward Vdd through resistors 475, 476, and 477 with resistor 477 terminating the string at Vdd.

The local sense string which samples the alternator's output voltage consists of resistors 482, 483, and 484 with resistor 482 starting the string at Vss and resistor 484 terminating the string at the "BSI" terminal.

The remote sense string is shown on FIG. 1*f* as previously discussed. The remote sense string feeds terminal "ESC". Terminal "ESC" may contain a second divider consisting of resistors 480 and 481.

The fixed, TC, local, and two of the remote sense resistors are mounted on the integrated circuit. These resistors are designed to operate in the voltage dividing mode, and therefore, the absolute tolerance of the resistors is not critical. The tracking of the resistor values is however critcal, in that, the voltage division factor must be held to very close tolerances. By way of an over simplified example, if it is desirous to obtain a voltage division factor of 0.2, this could be accomplished by placing a 1 ohm resistor in series with a 4 ohm resistor. The method used to implement these resistors on the chip would be to mask five equal 1 ohm resistors. As the chip etching processes have too many variables to ascertain absolute control, the five 1 ohm resistors may vary from the targeted 1 ohm value. As each resistor has the same identical physical properties, the etching process will have nearly the same affect on each of the resistors. Therefore the ratio of the resistors will remain nearly constant while the absolute tolerance could vary considerably. In practice, an integer least common denominator will be derived of all the resistors in the string, and this same resistor value will be placed in series the required number of times to form the complete divider with taps added at the required division points.

The TC divider will now be explained. A single diode 474 is the only TC element within the voltage regulator unit. Diode 474 exhibits a negative voltage temperature characteristic of a given rate. Within the system parameters, the rate of change of the forward voltage developed across diode 474 with temperature will be maximum across said diode. As diode 474 is in series with three resistors 475, 476, and 477, the resistor 477 terminated at the Vdd fixed reference voltage, The rate of change of voltage with temperature will be lower at resistor junction 475 and 476, and even lower at the resistor junction of 476 and 477. Therefore, by changing the ratios of the divider points, any voltage to temperature rate of change value can be obtained over the range between zero and the TC limit imposed by diode 474. By adding more resistors taps in the TC string, the number of different TC curves can also be varied. While FIG. 2 shows the generation of two such TC curves, it is to be understood that the number of TC curves generated by this invention is not limited to this particular value.

The voltage available from the TC taps represents the voltage that will be inputted to the voltage comparator 401 as the reference voltage. The sample voltage is divided down to match the TC reference voltage where the sample voltage is at the magnitude where the comparator trip point is preferred. The undivided sample voltage divided by the comparator's reference voltage multiplied by the TC rate of change at the reference level will give the TC rate of change at the sample level.

By way of example, diode 474 could be masked to provide a TC of −2 mv/C at its anode. This maximum rate of TC change could be attenuated to −1.54 mv/C at the junction of resistors 475 and 476, and further attenuated down to −1.43 mv/C at the junction of resistors 476 and 477. Using the "BSI" string divider as the sample voltage source with a 25 degree C set point voltage of 14.7 volts, the voltage at resistor junction point 482 and 483 would multiply the TC rate of change at resistor junction 475 and 476 to −13.6 mv/C at the "BSI" terminal. Resistor junction 483 and 484 would multiply the TC rate of change voltage at resistor junction 476 and 477 to −10.9 mv/C at the "BSI" terminal. In this manner, by changing the number of taps in the reference and sample string dividers, by adjusting the voltage division ratio at each tap, and by selecting the taps with a hardwired decoder selecting specific analog switches, a number of TC curves can be generated at any desired set point voltage using only one diode as the TC source. Using the method described above to form the resistor dividers, the TC diode; the sample and reference string dividers; the decoder, and the analog switches can all be mounted in a single custom integrated circuit while holding very close tolerances without the need for further external circuit adjustments.

The comparator functions will now be explained. As previously explained, a time base energized decoder sequentially selects a pair of analog switches which connect the prescribed voltage sources to a single comparator, the results of the comparison being stored in a flip flop. Therefore, the comparator function will be described as the state of the corresponding flip flop.

Flip flop 402 stores the comparison of the voltage at resistor junction 472 and 473 with the divided voltage from the "BSI" terminal. The "BSI" terminal is always connected to main rectifier 1*b* output of FIG. 1*a* or 1*b* of the alternator through resistor 3*q* as shown in FIG. 1*f*. Flip flop 402 is only set if the voltage at "BSI" exceeds a maximum "fail-safe" value. If the fail-safe voltage is exceeded, flip flop 402 outputs a logical high that enables OR gate 458 that in turn enables AND gate 463. The other input to AND gate 46 is high if the "TOI" terminal is enabled. A high output from AND gate 463 biases transistor 3*e* of FIG. 1*f* conductive through resistor 464 of FIG. 2 through terminal "LDO" to illuminate the warning lamp 3a1 of FIG. 1*f* to warn the operator of the vehicle. Flip flop 402 also outputs a high to NOR gate 410 which in turn presents a low to flip flop 346, this flip flop causes flip flop 347 to reset. With flip flop 347 outputting a low, a path, dependent on how the integrated circuit is programmed, exists from flip-flop 347, through NOR gate 317, through NOR gate 319, through exclusive NOR gate 332, and finally to FET 353 to make this transistor conductive causing the field driver transistor to turn off. In other words, flip flop 402 has direct control on both the warning lamp and the field circuit, illuminating the lamp and rendering the field winding non-conductive if for some reason the alternator output voltage exceeds a predetermined level.

Flip flop 403 serves strictly a monitor function illuminating lamp 3a1 of FIG. 1*f* if either the local or remote sensed voltage exceeds a predetermined limit. The reference voltage applied to analog switch 413 is selected from either analog switch 449 or 450 depended on the application programming. The sample voltage applied to analog switch 414 is selected from analog switch 491 or 492 dependent on both application programming and the active sense circuit, either local or remote, the precise operation clearly shown in FIG. 2.

Flip flop 404 serves the set point comparator function and strictly controls the state of the field driver circuit. The reference voltage for this comparator function is applied to analog switch 415 and is selected from analog switch 451, 452, or 453 dependent on the application programming. Analog switch 451 is fed from analog switch 445 or 446, analog switch 445 is connected to a tap on the fixed divider, analog switch 446 is fed from analog switch 447 or 448 of which both these switches are connected to different taps on the fixed divider. Analog switch 452 is connected to a tap on the fixed divider. Analog switch 453 is fed from analog switch 478 or 479 of which, both these analog switches are connected to different taps on the TC divider.

The sample voltage is applied to analog switch 416 and may be fed from analog switch 443 or 444. Analog switch 443 is fed from either analog switch 460 or 461 of which both of these analog switches are connected to different taps on the remote sense divider. Analog switch 444 is fed from either analog switch 462 or 463 of which both these analog switches are connected to different taps on the local sense divider.

In this manner, the output voltage of the alternator may be regulated to a fixed voltage of different values or to a TC voltage of different values with different rates of change of regulated voltage versus temperature. Furthermore, various sense points in the alternator charging circuit system can be selected. The method of selecting either fixed or TC voltages being determined by a code hardwired into a customed designed integrated circuit as clearly shown in FIG. 2.

Flip flop 405 is used in certain applications requiring a vehicle operator visible warning lamp when a charging system under voltage condition exists. A fixed reference voltage is applied to analog switch 418 from the junction of fixed divider resistors 466 and 467. The sample voltage applied to analog switch 417 is sourced from either analog switch 454 or 455. Analog switch 454 is connected to a tap on the "BSI" terminal, said terminal being connected to the alternator output terminal through a trimming resistor. Analog switch 455 is fed from analog switch 491 or 492 dependent on whether local or remote sensing is selected. Analog switch 491 is connected to a tap on the remote sense divider sourced from terminal "ESC", and analog switch 492 is connected to a tap on the local sense divider sourced from terminal "BSI".

The output of flip flop 405 enables AND gate 456, the other inputs to said gate originating from inverter 330 and flip flop 212. Inverter 330 inputs a high if selected by the applications program. Flip flop 212 inputs a high if the set point voltage exceeded the reference voltage when the circuit of FIG. 2 is in the high speed mode, this operation will be explained later. The output of AND gate 456 causes the warning lamp 3a1 of FIG. 1*f* to illuminate as previously explained.

In this manner, a low voltage warning lamp indication is provided to the vehicle operator from selected points in the charging system circuit. Said indication being determined by a low voltage at the local sense or selectable from either the local or remote sense point as determined by a remote sense detector. With the mode of operation being determined by a hardwire program into a single customed designed integrated circuit.

Flip flop 406 stores the comparison of a fixed referenced voltage developed at the junction of resistors 465 and 467 as applied to analog switch 420 with the anode voltage of diode 474 as applied to analog switch 419. The 465–467 resistor junction voltage remains nearly constant with temperature. The anode voltage of diode 474 decreases at a predetermined rate with temperature. When said diode voltage becomes less than said resistor junction voltage, comparator 401 outputs a high into the "D" input of flip flop 406, said flip flop storing this data when selected by the previously explained time base decoder circuit. In other words, if the integrated circuit temperature were greater than a predetermined value, flip flop 406 will output a logical high, with the output of said flip flop being low if said temperature were lower than said predetermined value. A high output from flip 406 enables OR gate 458 which illuminates warning lamp 3a1 of FIG. 1*f* as previously explained. Said high output moreover disables NOR gate 319, a generic representation of a de Morgan negative logic NAND gate function, so that field driver circuits of FIG. 1 are made non-conductive until said temperature is lessened by lack of circuitry activity to assuage a prime cause of heat generation. In this manner, a single integrated circuit embodied diode, also responsible for battery charging temperature compensation, is used to prevent permanent said integrated circuit destruction caused by severe temperature rises related to extraordinary alternator operation.

Flip flop 407 stores the comparative result of a direct or indirect sourced voltage from the ignition switch or other operator controlled mechanism that is connected through terminal "TOI", divided by resistors 485 and 486 and applied to analog switch 422 to a fixed reference voltage source inputted to analog switch 421 from resistor junction 464 and 465. Resistor 489 provides an integrated circuit embodied low impedance source to minimize the effects of extraneous electrical noise, while resistors 486 and 485 provide a high input impedance source to analog switch 422 to limit diode substrate current. Said low impedance source embodied to restrain electrical transients that are adventitiously passed from terminal "TOI" to flip flop 407. In this manner, flip flop 407 outputs a high when operator intervention desires alternator operation, and said flip flop outputs a low when the path between the "TOI" terminal and vehicle battery is discontinued. The output of flip flop 407 enables AND gates 460 and 463, and NOR gate 319 through inverter 461. Enabled AND gate 460 permits the flow of a logic signal from the warning lamp logic to the "alternator is operating" predriver transistor 462. Enabled And gate 463 permits the flow of a logic signal from the warning lamp logic to the "warning lamp" biasing resistor 464. Enabled NOR gate 319 (a de Morgan NAND function) permits the passage of the field driver control logic to the field predriver transistors 351 and 353. In this manner, when the voltage input to the "TOI" terminal is less than a predetermined value, the field, field relay, and warning lamps are made non-conductive to emulate an "off" voltage regulator.

Flip flop 408 stores the comparative results from the remote sense terminal "ESC" divider, resistor junction 460 and 461 to the anode voltage of diode 474. Said flip flop storing a logical low if the voltage inputted from the remote sense divider is greater than a predetermined value. The output of flip flop 408 enables AND gate 457 which illuminates the warning lamp if NOR gate 602 or 606 were selected by the applications hardwired program. In other words, if either NOR gate 602 or 606 were selected, the warning lamp would illuminate with the loss of the remote sense detection voltage to indicate to the vehicle operator that said circuit is non-conductive. Flip-flop 408 also selects either analog switches 444, 445, and 492 or 443, 446, and 491, a selection is also made between analog switch 449 and 450 if application programmer NOR gate 602 or 606 is selected. The action of said analog gate selection is to determine essentially if either the local sense "ESC" or remote sense "BSI" terminal will be used as a source for the respective voltage comparative functions. In this manner, dependent on the presence of a voltage of a predetermined value on the remote sense resistive divider and the application selected, as clearly shown in FIG. 2, either the local or remote sense circuits will control the over, under, and setpoint voltage comparator functions. It is also made evident by tracing the circuits in FIG. 2, that the trip point voltage of the comparative result storing flip flop circuits 403 and 404 may be of different fixed reference values dependent on the presence of a predetermined voltage on the remote sense terminal "ESC" and the code hardwired into data terminals "A", "B", and "C".

Flip flop 409 stores the comparative result of a resistor 487 and 488 divided voltage applied to the "PI" terminal to the fixed reference voltage sourced from the junction of resistors 464 and 465. Resistors 487 and 488 forming a high impedance circuit to limit the substrate diode current and resistor 490 being of a low impedance value to limit the development of noise voltages. If the voltage applied to the "PI" terminal exceeds a predetermined value, flip flop 409 will output a logical high. The nature of the voltage applied to terminal "PI" may be either of a continuous DC voltage or of a pulsating voltage. If the voltage at terminal "PI" is pulsating, the output of flip flop 409 will change states conforming in a time relationship to trip level reference variations of the voltage at the "PI" terminal plus a slight error due to the finite sampling rate. The function of the flip flop 409 circuits is to normalize the magnitude of the "PI" terminal voltage and to condition the transient time of said input voltage to be compatible with the logic circuits of FIG. 2.

The output of flip flop 409 is applied the digital low pass filter circuit represented in FIG. 2 by the 100 series of reference numbers. The function of the digital low pass filter is to pass either the continuous DC or the pulsating stator voltage applied to the "PI" terminal and to reject any spurious noise voltages that are demarcated by having a state of duration less than a predetermined value that may appear on the "PI" terminal predominately caused by the field winding switching current.

The operation of low pass digital filter denoted by the 100 series of reference numbers in FIG. 2 will now be described. The normalized "PI" terminal input voltage is applied to analog switch 109, NAND gate 114, and OR gate 113. Gates 113, 114, and 115 compare the logic state of flip flop 409 with flip flop 104. If said states are identical, that is, either states are both high or both low, NAND gate 115 will output a logical high, with said high enabling analog switches 105 through 108 and disabling analog switches 109 through 112 through the action of inverter 116. With analog switches switches 105 through 108 enabled, the "D" inputs of flip flops 100 through 103 will be connected to the "Q" output of flip flop 104. Therefore, with each positive transition of clock pulse F/8, flip flops 100 through 103 will assume the state of flip flop 104. In other words, if the input were either a continuous high or a continuous low, the output appearing on the "Q" terminal of flip flop 104 would not change state.

If the input were to change state from the above described status, NAND gate 115 will output a logical low. NAND gate 115 will output a logical low if flip flop 104 is outputting a logical high while the input is at a logical low or if the output of flip flop 104 is outputting a logical low while the input is at a logical high. In this manner, the low pass digital filter shown as the group 100 series in FIG. 2 will not discriminate between positive or negative going input voltages. A low output from NAND gate 115 disables analog switches 105 through 108 and enables analog switches 109 through 112. With analog switches 109 through 112 enabled, the "D" input of each flip flop 101 through 103 will be connected to the "Q" output of the preceding flip flop indicated in FIG. 2 as being the next flip flop located schematically to the left. The "D" input of flip flop 100 is now connected to the output of flip flop 409. With each positive transition of clock pulse F/8 applied to flip flops 100 through 104, the state of flip flop 409 will be shifted one flip flop to the right in the flip flop 100 through 104 chain. If the output of flip flop 409 does not change state for four consecutive F/8 clock pulses, the input state to flip flop 100 will be shifted to flip flop 104, causing the output state of flip flop 104 to become identical to the state of said flip flop 409. In this manner, the output state of flip flop 409 must be held constant for a predetermined period of time before it is passed to the output flip flop 104 of the digital low pass filter. If the output voltage from flip flop 409 cannot maintain a given state for four consecutive F/8 clock pulses, flip flops 100 through 103 will have their respective "D" inputs reconnected to the "Q" output of flip flop 104 causing the said shifted logic level to be nullified. In this manner, logic states that are shorter in duration than a predetermined value will be rejected by the group 100 series digital low pass filter as shown in FIG. 2. In other words, the output of flip flop 409 has to maintain either a high or a low logic state for a predetermined period of time before it is permitted to pass through digital low pass filter represented by reference group series 100 in FIG. 2. In this manner, either negative or positive voltage stator pulses of less than a predetermined duration are rejected by said digital low pass filter.

The stator phase filtered output voltage from flip flop 104 is now processed by the speed and voltage detection circuit as represented by the 200 series reference numbers as shown in FIG. 2.

Selecting NOR gate 605 or 608 by the hardwired application code into terminals "A", "B", and "C" outputs a logical high through OR gate 613 of which said OR gate output enables AND gate 215. With AND gate 215 enabled a DC level voltage in excess of a predetermined level applied to terminal "PI" will result in a high logic level at OR gate 216. In this manner, the state of the output of OR gate 216 represents the alternator operation status with a logical high output from said OR gate delineating alternator operation and a logical low output delineating a none alternator operating condition.

Selecting other than NOR gates 605 and 608 in the applications programmer disables AND gate 215, resulting in the group 200 series circuit to operate in the speed detector mode.

The operation of the speed detector circuit will now be described. Flip flops 200 through 206 are connected as a binary "up" counter with each flip flop triggered by the NOT Q output of the preceding flip flop to emulate negative edge triggering while employing lower component count positive edge flip flops. The input to said binary counter is the F/64 clock pulse provided from the reference group 700 frequency divider binary counter. While said clock pulse, by way of example, is given as F/64, it is to be understood that this invention is not limited to this specific frequency division. In this manner, binary flip flops 200 through 206 are made to count in a continuous fashion.

A positive voltage transition, that exceeds a predetermined duration and magnitude, applied to terminal "PI" will clock flip flop 208, causing said flip flop to enable flip flop 209. A positive transition from the series 700 binary counter "F" output sets flip flop 209 resulting in the "NOT Q" electrode of said flip flop to output a logical low. Said logical low of flip flop 209 resetting flip flop 208 and flip flops 200 through 206. Flip flop 209 also sets high speed enable flip flop 210 and low speed enable flip flop 213. In this manner, a positive voltage of minimum time duration and magnitude applied to terminal "PI" develops a trigger pulse that resets binary counter 200-206 and sets both high and low speed enable flip flops 210 and 213 respectively.

NAND gate 207 outputs a logical low when binary counter 200-206 is at binary count level b1100. When binary counter 200-206 is at binary count level of b100 0000, the "Not Q" electrode of flip flop 206 outputs a logical low. It is to be understood that specific binary count levels are given by way of example and do not limit this invention to said specific levels. An environment is established thereof, in the logic circuits of group 200, wherein the binary counter 200-206, reset to zero, commences counting at a predetermined rate, initialized by a leading edge pulse of sufficient magnitude and duration, wherein the consequence of successive events is dependent on the elapsed time determined by the occurrence of next said leading edge pulse. If the occurrence of the next leading edge pulse transpires before binary counter 200-206 has reached the count of b1100, the binary counter 200-206 will be reset to zero, and as high speed enable flip flop 210 was preset by said previous leading edge pulse, the effect of the prevalent leading edge pulse is to set flip flop 211. The "Q" output of flip flop 211 giving notice to the recipient logic circuits of said output that the high speed mode is in effect. In like manner low speed enable flip flop 213 enables low speed flip flop 214, and as such, low speed flip flop 214 is set by said prevalent leading edge pulse. In this manner, if the time difference between sequential leading edge pulses as applied to terminal "PI" is less than the time it takes for binary counter 200-206 to count from zero to b1100, both high speed 211 and low speed 214 flip flops will output a logical high from their respective "Q" electrode. This condition will be henceforth, referred to as the, "high speed mode".

A condition prevails wherein the time difference between sequential leading edge pulses applied to the "PI" terminal are greater than the time it takes for binary counter 200-206 to count from zero to b1100, but less than said time between leading edge pulses for said binary counter to count from zero to b100 0000. With the preliminary conditions established as stated above, during the period that binary counter 200-206 is in the b1100 state, NAND gate 207 will output a logical low that acts to reset, and hold reset, high speed enable flip flop 210, for the duration that binary counter 200-206 is in the b1100 count state. As a secondary precaution, said reset pulse originating from NAND gate 207 assures that high speed flip flop 211 remains in the reset state. Low speed enable and low speed flip flops 213 and 214 respectively, operate in like manner to the high speed mode disclosed above. In this manner, if the time difference between sequential leading edge pulses as applied to terminal "PI" is greater than the time it takes for binary counter 200-206 to count from zero to b1100, but less than the time it takes for binary counter 200-206 to reach b100 0000, high speed flip flop 211 will output a logical zero and low speed flip flop 214 will output a logical high from their respective "Q" electrode. This condition will be henceforth, referred to as the, "low speed mode".

A further condition prevails wherein the time difference between sequential leading edge pulses as applied to terminal "PI" is greater than the time it takes for binary counter 200-206 to count from zero to b100 0000. In this circumstance, NAND gate 207 will reset and hold reset high speed enable and high speed flip flops 210 and 211 respectively, and in like manner, binary counter flip flop 206, with the resultant logical low at the "not Q" electrode of said flip flop, will reset and hold reset low speed enable and low speed flip flops 213 and 214 respectively, for the duration that binary counter 200-206 is at the b100 0000 count level. In this manner, if the time difference between sequential leading edge pulses as applied to terminal "PI" is greater than the time it takes for binary counter 200-206 to count from zero to b100 0000, both high and low speed flip flops 211 and 214 respectively, will output a logical zero. This condition will be henceforth, referred to as the, "indolent speed mode".

In applications wherein a separate vehicle controller, (not shown), interrupts the voltage at the "TOI" terminal to intentionally disrupt the operation of the alternator for the advantage of gaining an increased rate of acceleration by relieving the mechanical torque on the vehicle engine, (not shown), presented by said alternator, the magnitude of the voltage produced by the stator phase of said alternator may be insufficient to activate proper operation of the group 200 series speed detection circuit (through reference groups 400 and 100 as previously explained). Wherein the reactivating of said alternator may cause a perceptible indication of the warning lamp to alarm an observant vehicle operator as aforementioned in the prior art circuits. In the circuit scheme presented as reference group 200 as shown in FIG. 2, the duration of the warning lamp activation will be equal to the time difference between two sequential leading edge pulses as applied to terminal "PI". In consideration of the comparatively high speed the engine will sustain when the alternator is reactivated, the time differential between two sequential leading edge pulses will be extremely short, as such that, the ephemeral illumination of the warning lamp would be obscure to even the most alert vehicle operator.

Flip flop 212 is the low voltage enable flip flop. Flip flop 212 is held in the reset state whenever the speed detection circuit represented by reference group 200 is not in the high speed mode. In the high speed mode, flip flop 212 is enabled by high speed flip flop 211, whereas in this circumstance, flip flop 212 awaits for a clock pulse from setpoint flip flop 346 to be explained later. In this manner, the low voltage warning lamp does not illuminate unless the circuit of FIG. 2 is in the high speed mode and the circuit called for activation of the field circuit by the setting of flip flop 346 assuring that the low voltage condition is viable.

The reference group 300 in FIG. 2 manipulates clock pulses from the clock generator circuits from reference group 700 and as such, is called the clock logic group.

Figure 3:
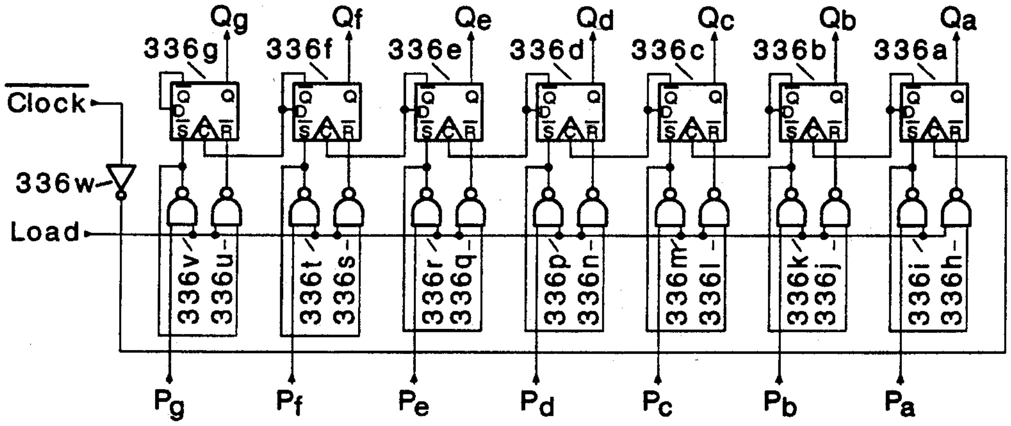
FIG. 3 is a schematic of one embodiment of the presettable UP counter circuit in FIG. 2.

"Up" counter block 336 is shown in detail in FIG. 3, and will now be explained. Flip flops **336*a*-336*g* are positive edge triggered "D" flip flops with both set and reset inputs. As shown in FIG. 3, flip flops 336*a*-335*g* are triggered by "NOT Q" flip flop electrodes to emulate negative edge triggered flip flops while gaining the lower component count of said identically wired pair of NAND gates 336*h*-336*v* to provide a preset function. A logical low input into the "Load" control line renders each said NAND gate disabled. Using NAND gate pair 336*h* and 336*i* as an example, a logical low from electrode "Pa" disables NAND gate 336*i*, applying a logical high to the "Load" terminal results in a logical high output from NAND gate 336*i* and a logical low output from NAND gate 336*h*. Said state of NAND gate pair 336*h* and 336*i* results in transferring a logical low into flip 336*a*. In like manner, applying a logical high into terminal "Pa" results into transferring a logical high into flip flop 335*a*. In this manner, applying a specific binary code into input terminals "Pa" through "Pg" and applying a logical high to the "Load" control line results in said specific binary code to appear, unchanged, at binary counter 336*a* through 336*g* outputs, "Qa" through "Qg". A "Not Clock" input to binary counter 336*a*-336*g* advances the count in said binary counter in an ascending binary fashion. Inverter 336*w*** provides the correct clock phase.

Figure 4:
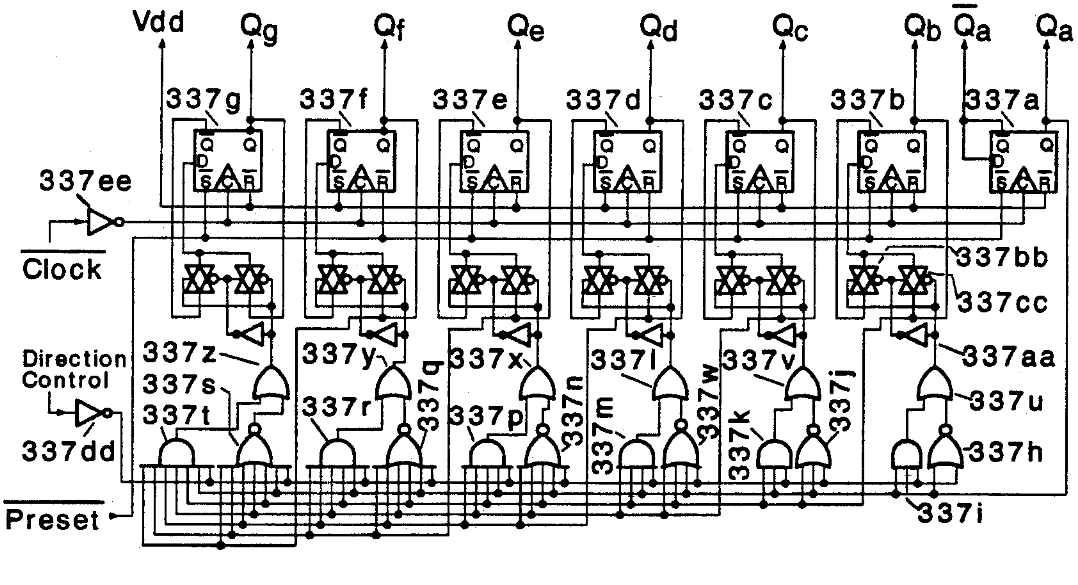
FIG. 4, illustrates one form of the presettable reversible counter in FIG. 2.

Reversible counter block 337 is shown in detail in FIG. 4. The operation of said reversible counter will now be explained. Referring to FIG. 4, The reversible counter consists of seven counting units consisting of RS "D" input positive edge triggered flip flops, six of said flip flops are equipped with two analog switches, and an inverter. It is to be understood that this invention is not limited to any specific number of counting units.

Analog switches 337*bb* and 337*cc* are typical of each counting unit, said switches connected in a form "C" arrangement with the "D" electrode connected to the common terminal. Said analog switches making contact from the "D" electrode of a given flip flop to either the "Q" or "Not Q" electrode of the same flip flop. A logical low outputted from OR gate 337*u* biases analog switch 337*cc* conductive and analog switch 337*bb* nonconductive, this connects the "D" electrode of flip flop 337*b* to the "Q" electrode of said flip flop. In this condition, a positive transition applied to the "C" electrode will not toggle or change the logical state of flip flop 337*b*. In like manner, if OR gate 337*u* outputs a logical low, the "D" electrode will be conductive to the "Not Q" electrode of flip flop 337*b*, wherein a positive voltage transition applied to the "C" electrode will toggle or change the logical state of said flip flop. In this manner, the toggling movement of a flip flop, with said additional circuitry, caused by the application of a positive voltage transition on the clock electrode can be controlled by a single logic command in a way where a logical low ceases toggling activity and a logical high resumes said toggling activity. Wherein, said positive voltage transition originates from inverter 337*ee*, said inverter providing the correct phase to reversible counter flip flops 337*a*-337*g*.

The toggling control two input OR gates 337*u*-337*z* are each fed from a NOR gate and an AND gate, with a common input electrode of each said NOR and AND gate connected to inverter 337*dd*. With any given NOR and AND gate equipped with a input electrode for each flip flop "Q" electrode counting unit descendent from any given counting unit. A logical high applied to inverter 337*dd* will cause said inverter to output a logical low, said low disabling all "Q" connected AND gates and enabling all "Q" connected NOR gates. With the "Direction Control" selecting all said NOR gates, any given flip flop counting unit will only change state if all lower unit flip flops are simultaneously outputting a logic low during the positive transition of the clock pulse. Such an arrangement results in a descending binary count on the "Qg-Qa" output terminals.

A logical low applied to inverter 337*dd* will cause said inverter to output a logical high, said high disabling all "Q" connected NOR gates and enabling all "Q" connected AND gates. With the "Direction Control" selecting all said AND gates, any given flip flop counting unit will only change state if all lower unit flip flops are simultaneously outputting a logic high during the positive transition of the clock pulse. Such an arrangement results in an ascending binary count on the "Qg-Qa" output terminals. Applying a logical low to the "NOT Preset" electrode will set the reversible counter 337 to the b101 0111 state which will be explained later.

In this manner, a single logic input can be made to control the direction a binary counter will count toward. It is to be understood that there are other well-known methods to perform a reversible binary counting function, with this method given only by way of example, to aid in the understanding of said clock logic circuitry, and reaction of said clock logic circuit with said reversible counter, with said clock logic reaction to said counter being an embodiment of this invention.

Referring to FIG. 2, NOR gate 335 outputs a logical high whenever up counter 336 is at the zero crossover state. NOR gate 321 gates the F/4 clock pulse in such a manner that when a positive transition is applied to NOR gate 321, said gate outputs a negative transition causing up counter 336 to advance one count, and if said count causes said up counter to cross zero, NOR gate 335 outputs a logical high with said high being applied back to NOR gate 321, in effect, aiding the phase of said clock pulse that initiated the action. In this manner, up counter 336 will automatically count whenever said counter count state is other than zero. In this manner, by loading data into up counter 336 preset electrodes other than zero, said counter will clock back to zero and hence will automatically turn itself off. In this manner, by making NOR gate 335 output signal in phase with initiating clock pulse as applied to NOR gate 321 input electrode, said phasing will augment clock phase in such a way that any noise or wanted transients that would appear on the output of NOR gate 335 would be given the opportunity to settle before the next positive clock pulse transition is inputted to said NOR gate. Such a method of having the advantage of using a low cost ripple counter for the up counter function.

NAND gate 334 outputs a logical low whenever reversible counter 337 is in the b111 1110 count state. A logical low from NAND gate 334 inhibits NAND gate 316, wherein said NAND gate enables NAND gate 309, wherein last said NAND gate inhibits noise reduction flip flop 345. NAND gate 316 provides a path from binary counter series 700 to the "Not Clock" electrode of counter 337. In this manner, said logic blocks the "Not Clock" input into reversible counter 337 when said counter is in the b111 1110 count state, thereby limiting the maximum count state in said reversible counter to b111 1110. In like manner NOR gate 333 outputs a logical high whenever said reversible counter is in the b000 0001 count state. NOR gate 333 outputs a logical high to inhibit NOR gate 306, last said gate inhibiting NAND gate 308. NAND gate 308 provides a path from binary counter series 700 to the "Not Clock" electrode of counter 337. In this manner, said logic blocks the "Not Clock" input of reversible counter 337 when said counter is in the b000 0001 count state, thereby limiting the minimum count state in said reversible counter to b000 0001. In this way, reversible counter 337 can only count down to b000 0001, or up to b111 1110, thereby limiting the data range that can be loaded into up counter 336.

When the system is in the indolent speed mode OR gate 216 outputs a logical low to the "Not Preset" electrode of reversible counter 337 that holds said counter in the preset state of binary value b101 0111.

Setpoint Flip flop 404 outputs a logical low to NOR gate 410 when the battery voltage is less than the selected reference voltage as previously explained. Said NOR gate 410 therefore will output a logical high which enables flip flop 346. When up counter 336 counts up to zero NOR gate 335 outputs a logical high that clocks flip flop 346. "Q" output of said flip flop is connected to the "Directional Control" electrode of said reversible counter, causing reversible counter 337 to count in the descending direction. In like manner, if the battery voltage is greater than the selected reference voltage, said logic will cause reversible counter to count in the ascending direction.

Cycle trigger flip flops 342 and 343 generate a 2/F length pulse at the trailing edge of the F/512 clock pulse due to inverter 328. Flip flop 344 is connected to flip flop 343 in the well-known shift register configuration. When the "Q" output of flip flop 343 is high, NAND gate 320 is inhibited to block clock pulses to reversible counter 337. When the "Q" output of flip flop 344 is clocked high, a "Load" command is sent to up counter 336, as to transfer data from reversible counter 337 to said up counter, the inhibit to NAND gate 320 is maintained to prevent the reversible counter from changing state during the load process, and then flip flop 347 is clocked high which enables the field driver to be explained later. In this manner, a periodic pulse is generated to initiate the start of a pulse width cycle, said pulse initiated if the battery voltage is less than the reference voltage causing flip flop 346 to be set, said flip flop enabling pulse width flip flop 347, said pulse width flip flop being clocked by said periodic pulse, and said pulse width flip flop being reset when the up counter crosses zero. In this way pulse width flip flop 347 generates a modulated pulse width wherein the instantaneous width of said pulse is equal in duration to the time it takes up counter 336 to count from the data value loaded from the reversible counter 337 to the binary value of zero. Expressed in other words, the duty cycle factor of said pulse width is equal to the reversible binary count b111 1110 minus the actual count in said reversible counter, with the difference of this result plus binary 1 divided by b111 1110 being equal to the duty cycle factor. In this way, the rate of change of said pulse width can be changed by varying the frequency to said reversible counter.

The output logic level of NOR gate 611 depends on whether application NOR gate 602, 603, or 606 or if NOR gate 601, 604, 605, 607, or 608 is selected. Said logical logic state of NOR gate 611 enabling either OR gates 302 and 310 or NAND gates 304 and 313. In this way, NAND gate 303 will output either F/4K or F/16K and NAND gate 312 will either output F/1K or F/4k. High speed flip flop 211 outputs a logic level to gates 304, 305, 313, and 314. Dependent on the logic state output of said flip flop, NAND gate 307 will either output F/4K or F/16K from NAND gate 303 or F/256 and NAND gate 315 will either output F/1K or F/16K from NAND gate 312 or F/256. In this manner, the rate of change of the pulse width signal from flip flop 347 is a function of the binary code hardwired into data terminals "A", "B", and "C" and the speed of the alternator.

NOR gate 319 serves as a link between the field winding logic and the field winding field predriver conditioning circuits. As explained previously, NOR gate 319 is disabled in an over temperature or a shut down condition, hence disabling the field winding driver circuitry.

NOR gate 317 provides the frequency modulated pulse width to combining NOR gate 319. NOR gate 319 is disabled in the "indolent speed mode" by OR gate 216 as previously explained. NOR gate 319 is selected by the application program that selects NOR gate 601, 602, 603, 604, 606, or 607. Expressed in different words, a frequency modulated pulse width is only outputted in either the high or low speed modes and only in specific pre-selected hardwired applications.

AND gate 322 provides a non-frequency modulated waveform that is active when the battery voltage is less than the selected reference voltage and inactive when the battery voltage is greater than the selected reference voltage. Said AND gate is disabled periodically by a 2/F wide pulse from flip flop 344 via NAND gate 325. Said 2/F wide pulse utilized to refresh charge on capacitor *3g* of FIG. *1f* in power MOSFET common drain applications. Said NAND gate 325 logically combining said 2/F pulse and setpoint logic level from NOR gate 410. In this manner, the circuit of FIG. 2 can operate in a setpoint voltage mode when selected by the application programming logic.

NOR gate 318 provides a periodic pulse width of fixed duty cycle width to combining NOR gate 319 when the circuits of FIG. 2 are in the "indolent speed mode". Said periodic fixed duty cycle pulse width being applied to the field winding driver circuits for the purpose of initially exciting said field winding. Said fixed duty cycle waveform generation being performed by logic gates 339, 340, 341, and inverter 338. Said logic gates and inverter combining binary counter frequency divider waveforms in such a manner to provide a fixed duty cycle waveform of sufficient width to assure excitation of alternator stator circuits. AND gate 324 enabling said fixed duty cycle waveform when the battery voltage is less than the selected reference voltage. NOR gate 318 enabling said fixed duty cycle waveform when the circuits of FIG. 2 are in the "indolent speed mode". In this manner, a periodic waveform of fixed duty cycle is provided to excite said alternator stator circuits with said waveform being disabled above the "indolent speed mode" or when the battery voltage is greater than the selected reference voltage. Said waveform being available for either frequency modulated pulse width or non-frequency modulated pulse width modulated applications. Wherein said reversible counter 337 is preset to a binary value approximate to fixed duty cycle waveform factor to provide a smooth transition.

NOR gate 319 outputs the composite field driver signal as explained previously. NOR gate 323 inverts the signal from NOR gate 319, however, the primary function of NOR gate 323 (the de Morgan NAND equivalent function in negative logic) is to be disabled by the inverted signal from flip flop 407 when the "TOI" terminal is less than a predetermined voltage. A logical high applied to NOR gate 323 from inverted flip flop 407 causes said gate to output a logical low to bias FET 351 in the non-conductive condition. Said non-conduction biasing conserves on standby current that would be drawn by series resistors 349 and 350 in the drain circuit of said FET.

Exclusive NOR gate 332 drives FET 353 from the field composite NOR gate 319. Terminal "DS" is either hardwired to terminal "Vdd" or made unconnected dependent on the field winding driver selected in FIG. 1 as to whether signal inversion is or is not required as previously explained. Resistor 348 assures a logical zero input into exclusive NOR gate when terminal "DS" is made unconnected.

The operation of the voltage doubler will now be explained. As noted previously, the voltage doubler is made active when the field driver circuit selected is as shown in FIG. *1e*. Terminal "DS" is made unconnected rendering exclusive NOR gate 332 as an inverting buffer stage. Integrated circuit embodied FET's 351 and 353 are designed to withstand voltages well beyond the system "load dump" values with FET 353 designed to drive PNP Darlington power transistors. A logical low output from NOR gate 319 results in logical high outputs from both NOR gates 323 and exclusive NOR gate 332, therefore, both FET 351 and 353 will be biased in the conductive state. With FET 351 conductive, a path for current is established originating from terminal "BAT" and flowing through diode *3h* and capacitor *3g*, both of FIG. *1f*, then into terminal "Cx" of FIG. 2, then through resistor 350, and terminating at the source of FET 351. In this way, capacitor *3g* commences to charge to the voltage on the "BAT" terminal, wherein said charge rate is limited by resistor 350 in such a manner as to limit the peak current through FET 351 without unduly restricting the charge on capacitor 3*g* within the apportioned time period. FET 353 is in like manner made conductive and serves to clamp the voltage into resistor 2*e* of FIG. 1*e* to ground assuring that power MOSFET 2*c*, also of FIG. 1*e* is made non-conductive. As such, field winding 2*a* of FIG. 1*e* current is near zero amperes.

At the moment when NOR gate 319 outputs a logical high, both NOR gate 323 and exclusive NOR gate 332 will output a logical low, rendering both FET 351 and 353 non-conductive. Diode 3*h* of FIG. 1*f* will be rendered reversed biased. A path for the voltage force is established, originating on terminal "BAT", through resistor 349, through capacitor 3*g* of FIG. 1*f*, through resistor 352, to terminal "FDO", through resistor 2*e* of FIG. 1*e*, and unto the gate electrode of power MOSFET 2*c* also of FIG. 1*e*. In this manner, the voltage across capacitor 3*g* of FIG. 1*f* is made to be series aiding to the voltage on terminal "BAT", providing sufficient bias for power MOSFET 2*c* to assure said MOSFET acquires a saturated conductive state.

As the apportioned time to charge and discharge capacitor 3*g* of FIG. 1*f* is made tolerably precise, the charging voltage developed across said capacitor will be a predetermined fraction of the voltage applied to the "BAT" terminal. Moreover, a predetermined maximum voltage is established between the gate and source electrodes of MOSFET 2*c* of FIG. 1*e* due the inherent characteristics of said MOSFET connected in the common drain mode. In this manner, the maximum voltage developed between said MOSFET gate and source electrodes is held to a value adequately below that voltage that may cause rupture between said electrodes.

Further protection is achieved by making the conductor in series with field winding 2*a* of FIGS. 1*c*, 1*d*, or 1*e* a fusible link (not shown), in that, if field current exceeds a predetermined maximum value due to an uncontrollable condition resulting from a mal-function, said fusible link will be rendered non-conductive to prevent damage to the electrical loads connected elsewhere in the vehicle.

This concludes the description of the preferred embodiments. A reading by those skilled in the art will bring to mind various changes without departing from the spirit and scope of the invention. It is intended, however, that the invention only be limited by the following appended claims.

What is claimed is:

1. A multiple application voltage regulator system having analog and digital circuit requirements comprising:
   - a single integrated circuit including:
     - means for performing both analog and digital circuit functions;
     - a single voltage comparator for performing any comparator functions required by the voltage regulator system; and
   - logic gates, a binary counter and plural decoders, the logic gates driven by the binary counter for providing an output waveform to prevent a simultaneous activation of a plurality of the decoders to thereby prevent switching transients.

2. A multiple application voltage regulator system having analog and digital circuit requirements comprising
   - a single integrated circuit including:
     - means for performing both analog and digital circuit functions;
     - a single voltage comparator for performing any comparator functions required by the voltage regulator system; and
   - a single TC diode and a programmable associated circuit coupled for rendering the single integrated circuit responsive to a plurality of voltage versus temperature conditions, the single TC diode capable of initiating a predetermined thermal shut down function.

3. A multiple application voltage regulator system having analog and digital circuit requirements comprising:
   - a single integrated circuit including:
     - means for performing both analog and digital circuit functions;
     - a single voltage comparator for performing any comparator functions required by the voltage regulator system; and
   - means including a single shunt regulator circuit for providing both power and a precision reference voltage to the single integrated circuit.

4. A multiple application voltage regulator system having analog and digital circuit requirements comprising:
   - a single integrated circuit including:
     - means for performing both analog and digital circuit functions;
     - a single voltage comparator for performing any comparator functions required by the voltage regulator system; and
   - a voltage doubler circuit having means for interfacing with a selected one of a plurality of field driver circuits and means for programming the single integrated circuit for the selected field driver circuit.

5. A multiple application voltage regulator system having analog and digital circuit requirements comprising:
   - a single integrated circuit including:
     - means for performing both analog and digital circuit functions;
     - a single voltage comparator for performing any comparator functions required by the voltage regulator system; and
   - means including a programmable decoder capable of being hardwired for selecting a plurality of circuit constants for a variety of voltage regulator applications.

6. A multiple application voltage regulator system having analog and digital circuit requirements comprising:
   - a single integrated circuit including:
     - means for performing both analog and digital circuit functions;
     - a single voltage comparator for performing any comparator functions required by the voltage regulator system; and
   - means including a stator phase input circuit programmable for use with either alternating current or direct current signals.

7. A multiple application voltage regulator system having analog and digital circuit requirements comprising:
   - a single integrated circuit including:
     - means for performing both analog and digital circuit functions;

a single voltage comparator for performing any comparator functions required by the voltage regulator system; and means including a digital low pass filter for restricting circuit activation by false logic signals.

8. A multiple application voltage regulator system having analog and digital circuit requirements comprising:

a single integrated circuit including:

means for performing both analog and digital circuit functions;

a single voltage comparator for performing any comparator functions required by the voltage regulator system; and a speed detector circuit and a warning lamp, and means for rendering the speed detector circuit responsive to changes in alternator speed to provide an output for permitting only an imperceptible activation of the warning lamp upon interruption of voltage regulator operation.

9. A multiple application voltage regulator system having analog and digital circuit requirements comprising:

a single integrated circuit including:

means for performing both analog and digital circuit functions;

a single voltage comparator for performing any comparator functions required by the voltage regulator system; and means for selectively providing a load control function to provide an output for gradually applying a field voltage at a programmable rate.

10. A multiple application voltage regulator system having analog and digital circuit requirements comprising:

a single integrated circuit including:

means for performing both analog and digital circuit functions;

a single voltage comparator for performing any comparator functions required by the voltage regulator system; and a warning lamp coupled with the single integrated circuit and means for continuously powering the single integrated circuit to prevent false warning lamp illumination.

11. A multiple application voltage regulator system having analog and digital circuit requirements comprising:

a single integrated circuit including:

means for performing both analog and digital circuit functions;

a single voltage comparator for performing any comparator functions required by the voltage regulator system; and logic interconnection means for eliminating one of a master and initial reset conditions.

12. A multiple application voltage regulator system having analog and digital circuit requirements comprising:

a single integrated circuit including:

means for performing both analog and digital circuit functions;

a single voltage comparator for performing any comparator functions required by the voltage regulator system; and means for cancelling impedance variations.

13. A multiple application voltage regulator system having analog and digital circuit requirements comprising:

a single integrated circuit including:

means for performing both analog and digital circuit functions;

a single voltage comparator for performing any comparator functions required by the voltage regulator system; and a field monitoring circuit including a redundant field signal transistor and an isolating diode for avoiding interruption of a main field circuit in the event that the isolating diode is shorted to a battery terminal.

14. A multiple application voltage regulator system having analog and digital circuit requirements comprising:

a single integrated circuit including:

means for performing both analog and digital circuit functions;

a single voltage comparator for performing any comparator functions required by the voltage regulator system; and means for receiving inputs from a stator circuit.

15. A multiple application voltage regulator system for regulating voltage from an engine-driven alternator used in a motor vehicle, comprising a single integrated circuit having within the single integrated circuit means for performing both voltage regulator analog and digital circuit functions, the single integrated circuit also having integrated therewith a single voltage comparator for performing any comparator function required for regulating voltage from the engine-driven alternator and means for performing at least the following comparative functions: fail-safe detection; over-voltage sensing; set point detection; under-voltage detection; thermal shut-down detection; and turn-on detection.

* * * * *